United States Patent
Haskins et al.

(10) Patent No.: US 9,973,550 B2
(45) Date of Patent: May 15, 2018

(54) SYSTEMS AND METHODS FOR APPLYING INTELLIGENCE AND PRIORITIZATION TO CALENDARED EVENTS

(71) Applicant: salesforce.com, inc., San Francisco, CA (US)

(72) Inventors: Kyle Matthew Haskins, Petaluma, CA (US); Lucy Li, San Francisco, CA (US); Rajan Patel, San Francisco, CA (US); Billy Ma, Berkeley, CA (US); Alicia Ong, San Mateo, CA (US); Rachna Singh, Foster City, CA (US); Lei Wang, San Carlos, CA (US); John Walter Taschek, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 726 days.

(21) Appl. No.: 14/483,941

(22) Filed: Sep. 11, 2014

(65) Prior Publication Data

US 2015/0074558 A1     Mar. 12, 2015

Related U.S. Application Data

(60) Provisional application No. 61/876,443, filed on Sep. 11, 2013, provisional application No. 61/878,816, filed on Sep. 17, 2013.

(51) Int. Cl.
| | |
|---|---|
| *G06F 3/0481* | (2013.01) |
| *H04L 29/06* | (2006.01) |
| *G06F 17/30* | (2006.01) |
| *G06Q 10/10* | (2012.01) |

(Continued)

(52) U.S. Cl.
CPC ........ *H04L 65/403* (2013.01); *G06F 3/04817* (2013.01); *G06F 17/30424* (2013.01); *G06Q 10/1093* (2013.01); *H04W 4/02* (2013.01); *H04W 4/206* (2013.01)

(58) Field of Classification Search
CPC .................................................. G06F 3/0481
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

Final Office Action for U.S. Appl. No. 12/437,418, dated Apr. 16, 2012.

(Continued)

*Primary Examiner* — David Choi
(74) *Attorney, Agent, or Firm* — Lorenz & Kopf, LLP

(57) ABSTRACT

Methods and systems are provided for displaying calendared events on a mobile computing device. The method includes: receiving, by the mobile computing device, a meeting invitation including meeting information and an email address; transmitting the email address to a customer relationship management (CRM) database; receiving, by the mobile computing device, contextual information associated with the email address from the CRM database; and displaying, by the mobile computing device, the meeting information and the contextual information.

14 Claims, 4 Drawing Sheets

(51) Int. Cl.
*H04W 4/02* (2018.01)
*H04W 4/20* (2018.01)

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,991,764 B2 | 8/2011 | Rathod |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0010270 A1 | 1/2008 | Gross |
| 2008/0147487 A1 | 6/2008 | Hirshberg |
| 2008/0178105 A1* | 7/2008 | Loewenstein ............ G09B 5/00 715/764 |
| 2008/0209320 A1 | 8/2008 | Mawhinney et al. |
| 2008/0249972 A1 | 10/2008 | Dillon |
| 2008/0275957 A1* | 11/2008 | Pouzin ................. G06Q 10/107 709/206 |
| 2009/0006940 A1* | 1/2009 | Hardt ................... G06F 17/243 715/224 |
| 2009/0063414 A1 | 3/2009 | White et al. |
| 2009/0100342 A1 | 4/2009 | Jakobson |
| 2009/0100347 A1* | 4/2009 | Schemers ............ G06Q 10/109 715/751 |
| 2009/0177744 A1 | 7/2009 | Marlow et al. |
| 2010/0125502 A1 | 5/2010 | Solomon et al. |
| 2010/0217757 A1 | 8/2010 | Fujioka |
| 2010/0241576 A1 | 9/2010 | Beeri |
| 2010/0316203 A1* | 12/2010 | Stanford ............. H04M 1/2473 379/93.05 |
| 2011/0164740 A1* | 7/2011 | Gisby ................... H04L 63/104 379/202.01 |
| 2011/0209067 A1 | 8/2011 | Bogess et al. |
| 2011/0258204 A1 | 10/2011 | Hubbard et al. |
| 2012/0150547 A1* | 6/2012 | Parker, III ............. G06Q 30/01 705/1.1 |
| 2012/0233137 A1 | 9/2012 | Jakobson et al. |
| 2012/0290407 A1 | 11/2012 | Hubbard et al. |
| 2013/0159220 A1* | 6/2013 | Winn ................ G06F 17/30702 706/12 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0339082 A1* | 12/2013 | Kazmaier ............ G06Q 10/101 705/7.29 |
| 2014/0047316 A1* | 2/2014 | Strydom ................ G06F 3/0481 715/233 |
| 2015/0074558 A1* | 3/2015 | Haskins ............. G06Q 10/1093 715/753 |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

Linear Combination—Wikipedia (http://en.wikipedia.org/wiki/Linear_Combination (accessed Jul. 16, 2012).

* cited by examiner

SYSTEMS AND METHODS FOR APPLYING INTELLIGENCE AND PRIORITIZATION TO CALENDARED EVENTS

CROSS-REFERENCE TO RELATED APPLICATIONS

This application claims the benefit of the following United States provisional patent applications: i) Ser. No. 61/876,443, filed Sep. 11, 2013; and ii) Ser. No. 61/878,816 filed Sep. 17, 2013. The entire contents of the foregoing provisional applications are incorporated herein by this reference.

TECHNICAL FIELD

Embodiments of the subject matter described herein relate generally to mobile and hand held computer systems and applications for managing electronic calendars, and more particularly to prioritizing calendar entries and enriching them with information retrieved from remote sources.

BACKGROUND

The unprecedented growth of mobile and social technologies has redefined the way people connect and communicate. On-line social networking sites such as Facebook™, Linkedin™, Pinterest™, Tumblr™, Google+™ Hootsuite™, and Twitter™ have forever changed the way people share information with each other. Smartphones, tablet computers, IPads, and other mobile devices are increasingly used by many consumers as their primary platform for communicating and managing their social, business, financial, and personal affairs. Salesforce1™, available at www.salesforce.com/salesforce1/, is a mobile application providing a sales, service, and marketing platform for facilitating social collaboration with colleagues, partners, products, employees, and customers.

In business environments, collaborative sites have also shaped the way groups of related users (e.g., "Deal Teams") share information about a sales opportunity or other issues surrounding products or services pursued or offered by the team. Presently known enterprise social network platforms such as Chatter™ released in June 2010 by Salesforce™ and available at www.salesforce.com, provide the user with a feed-based stream of posts for tracked objects including coworkers, files, and other project related data objects.

At the same time, software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Sales and marketing professionals typically manage their day through an electronic calendar running on a mobile device, such as an Android or IOS default calendar. However, presently known calendaring applications do not include contextual information that may be available from various sources, such as connected devices, social networking systems, and external databases. As a result, a person's calendar may include meetings with individuals and companies, but may lack contextual information about those entities. Moreover, a calendar may be filled with entries from multiple sources, including work-related, event-related, and personal-related activities, which may be disregarded, resulting in lower response rates. Existing calendaring systems further lack the ability to rank or prioritize calendar entries based on contextual information.

Systems and methods are thus needed which enrich, prioritize, or otherwise apply intelligence to calendar entries.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Figure 1:
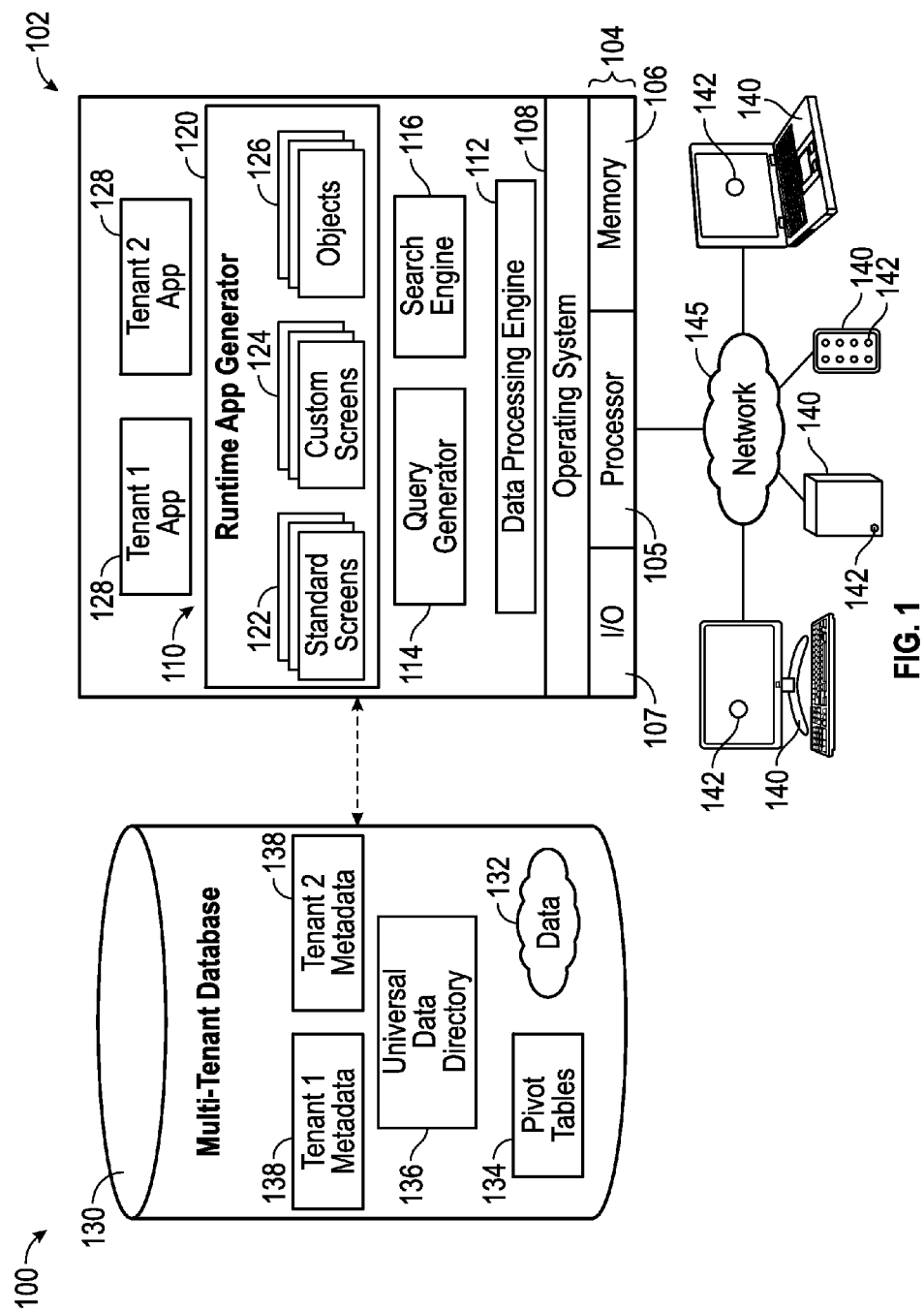
FIG. 1 is a schematic block diagram of a multi-tenant computing environment in accordance with an embodiment.

Embodiments of the subject matter described herein generally relate to systems and methods for enriching and prioritizing calendared events based on information retrieved from remote sources.

In an embodiment, the names and email addresses of invitees to a calendared event may be used to retrieve contextual information from remote sources to thereby enrich and/or prioritized the calendared event. For example, the system may pull in an event from a local calendar application, and match the names of meeting attendees with additional information from their corresponding contact records in a remote CRM database. While preparing for the meeting, the user may click on an attendee in the calendared event to display contextual information such as the account the attendee is related to, recent activities, and notes relating to the attendee. If the CRM or other remote database includes a picture of the attendee, it may be presented in the calendared entry; otherwise, an application program interface (API) may be employed to retrieve a picture from a social media network (e.g., Linkedin, Twitter, Facebook). If no picture is available, the system can search the internet for one (e.g., form data.com).

Various embodiments utilize the email address typically associated with an invitation to a calendared event to retrieve contextual information (e.g., contact information such as name, title, company, opportunities, notes) from a remote database. Alternatively, the invitee's name may be used to retrieve the additional information.

In another embodiment, the calendar application may be configured to parse the "notes" section of the event to identify the "call in" telephone number and access code such that the user may click a call button associated with the calendared event to automatically dial the conference bridge and enter the participant (or leader) access code parsed from the event notes.

In another embodiment, the system (e.g., the calendar application) may be configured to identify breaks in the user's schedule and suggest activities at nearby locations based on the global positioning system (GPS) geolocation of the mobile device running the calendar application. The suggested activities may be based on prior usage patterns and behavior (e.g., coffee breaks at preferred coffee venues). Alternatively, the system may suggest that higher priority or past due tasks (e.g., bookkeeping/administrative tasks) be performed during schedule breaks.

Presently known calendaring systems and applications tend to be schedule driven, as opposed to task driven. Moreover, contextual information surrounding a calendared event must be manually entered by the user, which is time consuming and cumbersome. Finally, existing calendar applications do not effectively integrate and prioritize personal or consumer activities vis-à-vis enterprise (e.g., work related) activities. Accordingly, an improved calendar application may be configured to import contextual information from remote sources to allow a user to prioritize potentially conflicting calendared events, and to integrate activities and events with one another based on the contextual information, as opposed to presently known calendaring applications which tend to integrate events based on time of day. The present disclosure provides techniques for facilitating the integration and prioritization of personal and professional activities and events based on, inter alia, information retrieved from sources outside the calendar application.

In an exemplary embodiment, a mobile application is provided by a demand services environment. While an example embodiment appears on a mobile device, expressive interactions with social content items may be implemented in various forms, including web browsers, web pages, applications, and the like operating on various devices. As described in greater detail below, a "My Day" widget operating on the mobile application may include a number of features, such as displaying data from an on-demand services environment after importing native events from the mobile device. This data may include the titles of the people who are invited to a meeting, account information associated with the event, people on the user's team that are also invited to the calendared event (e.g., meeting), and so forth. Other types of information may be gathered through various application programming interfaces (APIs).

In an embodiment, a display screen presents calendared events for the viewing user's day. Moreover, the calendar application may be configured such that multiple calendars feed the events listed in the "My Day" screen. In one embodiment, tasks may be integrated with the "My Day" screen to illustrate to the viewing user which tasks are due today. In this way, the viewing user may quickly get a sense of what his or her day will look like based on the information provided through the mobile application connected to the on-demand services environment (e.g., a CRM database).

An on-demand services environment may provide an intelligent calendaring platform that enables users to quickly and efficiently manage their calendars. Through mobile devices, desktop computers, tablet computers, and other user devices, users may configure an intelligent calendar to receive contextual information about other users and/or entities sending calendar invites or reminders. Through the intelligent calendaring platform, various sources of information may provide context to the importance of entries to the user. This information may be analyzed to reprioritize events, calendar invites, and other interactions with a user's calendar. For example, lower priority events may be automatically subordinated to higher priority events based on predetermined metrics. For example, tasks for an opportunity scheduled to close next month may be assigned a lower priority than tasks associated with an opportunity scheduled to close tomorrow. As a result, the calendaring experience is more relevant and important events are prioritized and presented to the user ahead of less relevant and important events, subject to manual override or manual acceptance of the reprioritization, if desired.

Various algorithms, machine learning techniques, regression analysis, and heuristics may be used by the intelligent calendaring application to rank or otherwise prioritize events based on contextual information. Alternatively or in addition to automatic prioritization, users may manually categorize events with higher and lower priorities. In one embodiment, the on-demand services environment may categorize events with higher and lower priorities based on past interactions by the user. In one embodiment, certain types of events may be automatically assigned a priority level, such as wedding anniversaries, birthdays of close connections and/or siblings. Other types of contextual information may be associated with notifications of events, such as offers to purchase gifts or send cards in association with the events on the calendar. Gamification techniques, such as badges, leaderboards, and other game elements, may be used to reinforce positive behavior, such as acknowledging events and/or responding to calendar invites. Positive behavior may be showcased in collaborative environments in an on-demand services environment (such as a CHATTER™ feed) for the user.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a collaboration solution such as the Chatter system, described below.

Figure 2:
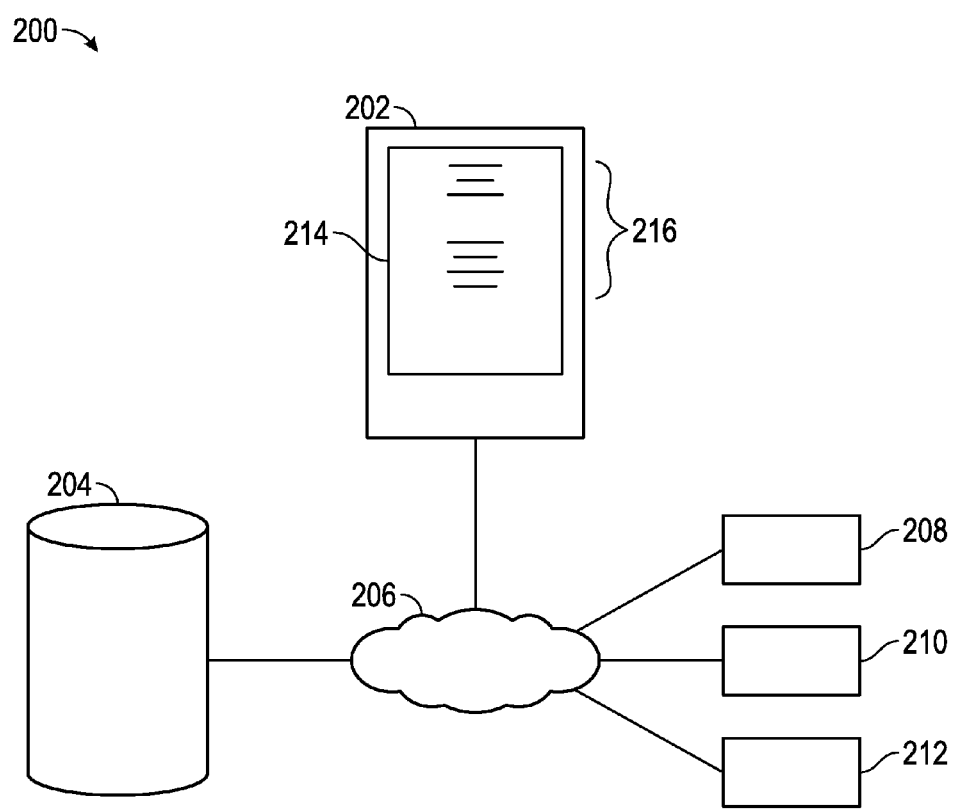
FIG. 2 is a schematic block diagram of a mobile calendar application configured to retrieve information associated with meeting invitees from a plurality of remote sources in accordance with an embodiment.
Figure 3:
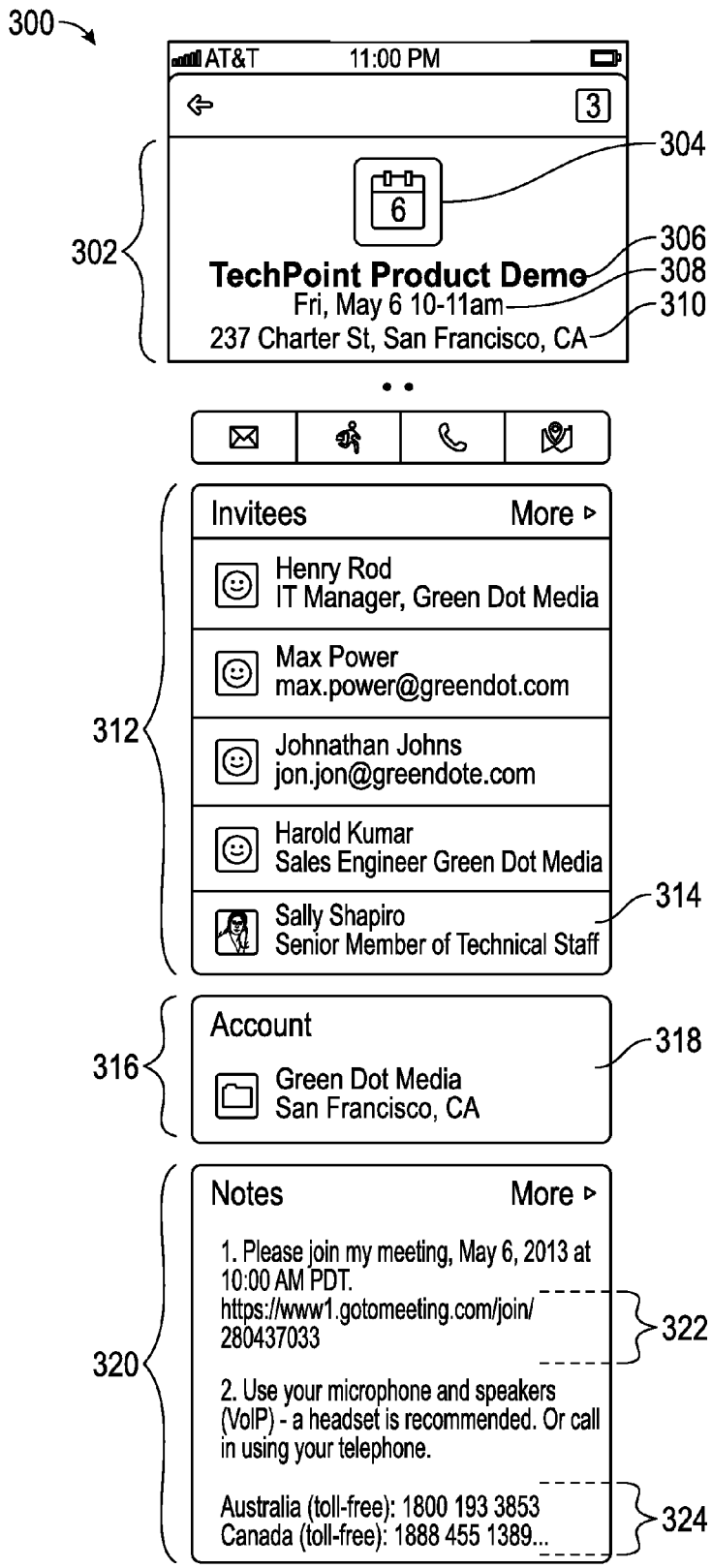
FIG. 3 is a screen shot of an exemplary mobile display of calendared events in accordance with an embodiment.
Figure 4:
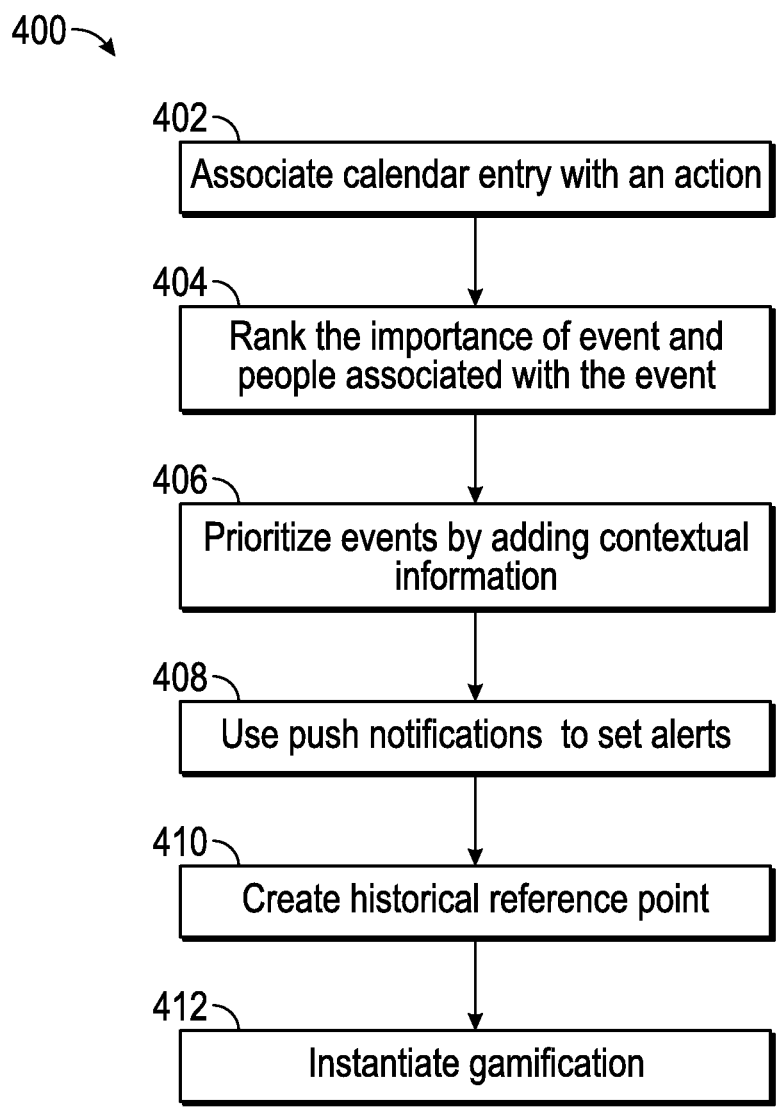
FIG. 4 is a flow chart illustrating a method for enriching and/or prioritizing calendared events in accordance with an embodiment.

FIGS. 2-4 illustrate various embodiments of a calendar application configured to pull calendared event information from a native device, and contact information (e.g., contacts, leads, users, accounts, opportunities) from a remote source such as a CRM database available at www.salesforce.com. The user may perform some logic to correctly select the right information, (e.g., pull contacts based on email addresses of invitees and suggest an account based on those contacts and company details as stored in the remote database). In other embodiments, the My Day widget may be customized by an organization level administrator such that other external APIs (such as customer-owned APIs, Social Graph APIs (Facebook, LinkedIn) can be called. By way of non-limiting example, a sales person using the My Day widget may be notified that there have been several Service Cloud cases with the account and that a Forecasting API may project that the customer may be leaving. The My Day widget may proactively create an event or create some notification based on this information from the API. Similarly, customer-owned APIs may be accessible only by those customers, based on rules of Multi-tenancy.

FIG. 2 is a schematic block diagram of a distributed data processing system 200 for implementing a mobile calendar application configured to retrieve information associated with meeting invitees from a plurality of remote sources in accordance with an embodiment. The system 200 includes a computer 202, a primary data storage module 204, and a plurality of remote data sources 208, 210, 212 accessible to the computer 202 via a network connection 206. The computer 202 may be a desk top, mobile, lap top, tablet, hand held, console, cellular, or any other type of computing device which includes or has associated therewith a display 214 and a processor (not shown) for executing and displaying a calendar application 216. The network connection 206 may comprise any wireless or wired network such as a local area network (LAN), wide area network (WAN), virtual private network (VPN), the internet, or any other network modality which facilitates connectivity and data transfer among the computer 202, the primary data storage module 204, and the remote data sources 208, 210, 212 (hereinafter singly or collectively referred to as the "cloud"). In an embodiment, the remote data sources 208-212 may comprise web sites such as, for example, Facebook™, Linkedin™, Twitter™, and the like. The primary data storage module 204 may comprise any public or proprietary contacts database application such as, for example, a customer relationship management (CRM) module of the type available at www.salesforce.com.

With continued reference to FIG. 2, a calendared event presented in the calendar application 216 may include information pertaining to one or more invitees such as a name, email address, or the like. In an embodiment, the calendar application may be configured to access information from the database 204 associated with an email address. For example, a contact object stored in the database 204 may include the name, email address, telephone number, title, company name, and various other information. By using an email address to interrogate the database 204, information associated with the email address may be retrieved and imported to the calendar application 216 to thereby enrich the information content of the calendared event, as described in greater detail below in connection with FIG. 3.

More particularly, FIG. 3 is a screen shot of an exemplary graphical user interface (GUI) 300 presented to a user by a calendar application in accordance with an embodiment. In particular, the GUI 300 represents a calendar event and includes a meeting details section 302 and an invitee/attendee section 312. The meeting details section 302 includes a meeting day field 304, a meeting title or descriptor field 306 (e.g., "Techpoint Product Demo"), a meeting date/time field 308 (e.g., "Fri. March 6 20-11 am"), and a meeting venue or location field 310 (e.g., "237 Charter St., San Francisco, Calif."). The invitee/attendee section 312 lists the individuals or entities invited to the meeting or otherwise anticipated to be in attendance. In the illustrated embodiment, the following individuals are listed as invitees: Henry Rod; Max Power; Jonathan Johns; Harold Kumar; and Sally Shapiro. It will be appreciated that the foregoing invitees were sent an invitation to their respective email addresses. As such, the calendar application may be configured to use the email addresses to retrieve additional information for each invitee from the CRM database 204 shown in FIG. 2. Some or all of this additional information may be displayed for the user upon request. In particular, by highlighting and/or clicking on an invitee's name, a user may cause the calendar application to display the additional information.

With continued reference to FIG. 3, in the illustrated example, the user has clicked on invitee field 314 corresponding to "Sally Shapiro". In response, the system displays additional information associated with Sally Shapiro from the CRM database, for example, by interrogating the database using Sally Shapiro's name, email address, or other suitable metric. More particularly, the system may retrieve and import a parent object 316 (e.g., an account object) and one or more child objects 320 such as, for example, notes, prior activity, recent cases, and other information associated with Sally Shapiro which may have previously been entered into the CRM database by the user of the linked calendar application.

In the illustrated example, the "account" object 316 indicates that Sally Shapiro is associated with Green Dot Media, located in San Francisco. By enriching the event data with this additional information, the user may better prepare for or otherwise participate in the upcoming meeting. In addition, the calendar application may display a note field 320 including information pertaining to the meeting itself, such as a universal resource locator (URL) field 322 (e.g., "https://www1.gotomeeting.com/join/280437033") and an access telephone number field 324. In this regard, the calendar application may be further configured to parse the email embodying the meeting invitation to isolate the meeting URL and/or access telephone number, so that the user may click on an appropriate icon to join the meeting, rather than having to enter a URL or phone number as with existing calendar applications.

FIG. 4 is a flow chart of illustrating a method 400 for enriching and/or prioritizing calendared events in accordance with an embodiment. The method 400 includes creating (Task 402) a calendar entry and associating it with an action. For example, "go to the store to buy groceries" may be the calendar entry; attach a grocery list may be the associated action so the user knows which items to purchase at the store. Alternatively, "be at conference room 8 at 10:30 Tuesday" may be the calendar entry; the associated action may be to attach the attendees and their titles and companies, and attach a meeting agenda and research results so that the user is prepared to specifically address each agenda topic with each attendee. As an additional example, "today is your wife's birthday" may be the calendar entry, and the associated action may be to order flowers from 1-800-flowers.com.

In various embodiments, the calendar application may be configured to push the associated actions onto the calendar entry to facilitate prioritization and integration among other potentially competing events, as well as to provide context for the events to enrich their presentation to the user. In addition, an historical reference point may be noted in a database associated with the calendar application. That is, if an action associated with a calendared event results in a favorable outcome, the user may configure the calendar application to associate the same or a similar action with the same or similar event in the future. For example, if the items on the grocery list worked well at the last party (e.g., avoid serving strawberries because your boss is allergic to them), the monthly staff reports were helpful at the last monthly staff meeting, or the user's wife loved the flowers, these same actions could be pre-programmed to be associated with their corresponding events when these events next occur (subject to user confirmation, if desired).

The method 400 may also include ranking the importance of persons sending the information, inviting the user to the meeting or other event, or other attendees, and ranking the importance of the event (Task 404).

The method 400 may also include prioritizing (Task 406) important events by adding contextual information through one or more of the following techniques: i) using an algorithm to associate a date with a milestone; ii) associating a milestone to other existing or historical milestones available from sources such as Facebook Timeline, Wolfram Alpha's calculation engine, and Google; and iii) embedding the historical milestones in the calendar activity.

The method 400 may also include using push notifications to set alerts on mobile devices and automatically embedding context into the push notification (e.g., "it is your sister's 25th anniversary"), and creating a connection between the push notification and an offer (e.g., "would you like to send a card or a Facebook gift") (Task 408).

The method 400 may also include creating (Task 410) an historical reference point (personal memory, institutional memory) so that previous actions are captured digitally.

Finally, the method 400 may include instantiating (Task 412) gamification technology to reward positive behavior, for example, awarding a silver star for acknowledging an anniversary. Gamification techniques may also include using a report card, awarding points with or without a leader board, or using other metrics to reward performance which may be measured in terms of successful integration and/or prioritization of potentially competing events. In this regard, a user may be penalized for unsuccessful management of calendared events (e.g., missing your mother's birthday may carry a higher penalty than missing a co-worker's birthday).

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method of displaying calendared events on a mobile computing device, the method comprising:
    receiving, by the mobile computing device, a meeting invitation including meeting information and an email address, where the meeting information comprises: meeting name, meeting location, meeting date, bridge conference telephone number, access code, and invitees;
    transmitting the email address for use as an identifying metric to a customer relationship management (CRM) database;
    receiving, by the mobile computing device, contextual information associated with the identifying metric from the CRM database, where the contextual information comprises at least one of: name, title, picture, company affiliation and opportunity;
    displaying, by the mobile computing device, the meeting information and an invitee icon associated with an invitee, and in response to a user clicking the invitee icon, displaying the contextual information;
    parsing the meeting information to determine a bridge conference telephone number and an access code; and
    presenting the user with a connection icon which, when clicked, automatically dials the bridge conference telephone number and enters the access code.

2. The method of claim 1, wherein the CRM database is stored in an on demand, multitenant computing environment.

3. The method of claim 1, wherein transmitting and receiving comprise transmitting and receiving to and from an internet based network.

4. The method of claim 1, further comprising:
    retrieving a picture of an invitee to the meeting from an on-line social media site; and
    displaying, by the mobile computing device, the picture along with the meeting information and the contextual information.

5. A computer processor for implementing a method of prioritizing electronic calendared events on a mobile computing device, the processor configured to perform the steps of:
- creating a calendar entry;
- retrieving an action from a remote data source and associating the action with the calendar entry by using an email address as an identifying metric for the action, where the calendar entry comprises: meeting name, meeting location, meeting date, bridge conference telephone number, access code, and invitees;
- receiving, by the mobile computing device, contextual information associated with the action, where the contextual information comprises at least one of: name, title, picture, company affiliation and opportunity;
- prioritizing the calendar entry based on the contextual information;
- displaying, by the mobile computing device, the calendar entry and an invitee icon associated with an invitee, and in response to a user clicking the invitee icon, displaying the associated action; and
- parsing the calendar entry to determine a bridge conference telephone number and an access code; and
- presenting a connection icon which, when clicked, automatically dials the bridge conference telephone number and enters the access code.

6. The method of claim 5, wherein the remote data source comprises a customer relationship management (CRM) database.

7. The method of claim 5, wherein the processor is further configured to:
- identify a break in a user's schedule; and
- suggest an activity to be performed by the user during the break.

8. The method of claim 7, wherein the mobile computing device includes a global positioning system (GPS) for determining a geolocation, and the processor is configured to select the suggested the activity from nearby locations based on the geolocation of the mobile computing device.

9. The method of claim 8, wherein the suggested activity is based on prior usage patterns of the user.

10. The method of claim 7, wherein the suggested activity is based on at least one of higher priority or past due tasks.

11. The method of claim 5, wherein the remote data source comprises an on-demand, multi-tenant computing environment.

12. The method of claim 1, wherein the processor is further configured to create an historical reference point establishing a connection between the calendar entry and the associated action, and to associate the action with a subsequent occurrence of the action without accessing the remote data source.

13. A computer application embodied in a non-transitory medium for operation by a computer processor associated with an on-demand, multi-tenant computing environment, the application configured to implement the steps of:
- transmitting, to a mobile computing device, a meeting invitation including meeting information and an email address, where the meeting information comprises: meeting name, meeting location, meeting date, bridge conference telephone number, access code, and invitees;
- receiving, from the mobile computing device, an email address for use as an identifying metric;
- retrieving contextual information associated with the identifying metric from a customer relationship management (CRM) database, where the contextual information comprises at least one of: name, title, picture, company affiliation and opportunity;
- transmitting, to the mobile computing device, the contextual information for display by the mobile computing device along with the meeting information; and
- displaying, by the mobile computing device, the meeting information and an invitee icon associated with an invitee, and in response to a user clicking the invitee icon, displaying the contextual information;
- parsing the meeting information to determine a bridge conference telephone number and an access code; and
- presenting the user with a connection icon which, when clicked, automatically dials the bridge conference telephone number and enters the access code.

14. The computer application of claim 13 further configured to suggest an activity to be performed by a user during a break in the user's schedule based on prior usage patterns of the user.

* * * * *